United States Patent
Mase et al.

(10) Patent No.: US 10,168,043 B2
(45) Date of Patent: Jan. 1, 2019

(54) LIGHT-EMITTING ACCESSORY HAVING A LIGHT GUIDE BODY WITH AN INCLINED PORTION

(71) Applicant: HAYASHI TELEMPU CO., LTD, Nagoya-shi, Aichi (JP)

(72) Inventors: Tatsuo Mase, Nagoya (JP); Tadayoshi Kamei, Nagoya (JP); Takuya Matsumoto, Miyoshi (JP); Hiroyoshi Konishi, Miyoshi (JP)

(73) Assignee: HAYASHI TELEMPU CO., LTD, Nagoya-shi, Aichi (JP)

( * ) Notice: Subject to any disclaimer, the term of this patent is extended or adjusted under 35 U.S.C. 154(b) by 68 days.

(21) Appl. No.: 15/176,329

(22) Filed: Jun. 8, 2016

(65) Prior Publication Data
US 2016/0363309 A1 Dec. 15, 2016

(30) Foreign Application Priority Data

Jun. 10, 2015 (JP) ................................ 2015-117408

(51) Int. Cl.
*F21V 33/00* (2006.01)
*F21L 4/00* (2006.01)
(Continued)

(52) U.S. Cl.
CPC ........ *F21V 33/0008* (2013.01); *A45C 11/323* (2013.01); *A45C 15/06* (2013.01); *F21L 4/00* (2013.01); *G02B 6/005* (2013.01); *G02B 6/0041* (2013.01); *G02B 6/0065* (2013.01); *F21S 9/02* (2013.01); *F21V 3/062* (2018.02);
(Continued)

(58) Field of Classification Search
CPC .. F21V 33/00; F21V 33/0004; F21V 33/0008; G09F 13/04; G09F 13/049; G09F 2013/0463; G09F 2013/0481; G09F 13/08; F21W 2121/06; G02B 6/0045; G02B 6/0058; G02B 6/006; G02B 6/0061; F21Y 2101/00; F21Y 2115/10; F21L 4/005;
(Continued)

(56) References Cited

U.S. PATENT DOCUMENTS 6,971,758 B2 * 12/2005 Inui ..................... G02B 6/0018
362/23.01
2010/0247901 A1 * 9/2010 Hsieh .................. G02B 6/0041
428/328

(Continued)

FOREIGN PATENT DOCUMENTS

JP 2009-183327 A 8/2009
JP 3161581 U 8/2010

Primary Examiner — Suezu Ellis
(74) Attorney, Agent, or Firm — Sughrue Mion, PLLC

(57) ABSTRACT

A light-emitting accessory including: a light source; a light guide body that guides the light radiated from the light source; a case body that holds the light source and the light guide body and has an attachment to an outside thereof; a cover body formed by a light permeable material and being attached to the case body to cover the light source and the light guide body. The light guide body has a back surface facing the light source, and a front surface opposite to the back surface. In the vicinity of the center of the front surface is made an inclined portion which is inclined in a direction of thickness of the light guide body, and the light source confronts the inclined portion.

7 Claims, 4 Drawing Sheets

(51) Int. Cl.
*A45C 11/32* (2006.01)
*A45C 15/06* (2006.01)
*F21V 8/00* (2006.01)
*F21V 23/04* (2006.01)
*F21W 121/06* (2006.01)
*F21S 9/02* (2006.01)
*F21Y 101/00* (2016.01)
*F21Y 115/10* (2016.01)
*F21V 3/06* (2018.01)

(52) U.S. Cl.
CPC .......... *F21V 23/04* (2013.01); *F21W 2121/06* (2013.01); *F21Y 2101/00* (2013.01); *F21Y 2115/10* (2016.08)

(58) Field of Classification Search
CPC ... F21L 4/022; F21L 4/027; F21L 4/04; F21L 4/045
USPC ... 362/311.01–311.04, 311.06–311.1, 311.14
See application file for complete search history.

(56) References Cited

U.S. PATENT DOCUMENTS

| | | | | |
|---|---|---|---|---|
| 2012/0057342 | A1* | 3/2012 | Shih | G09F 13/04 362/235 |
| 2012/0069579 | A1* | 3/2012 | Koh | G02B 6/0021 362/307 |
| 2014/0145419 | A1* | 5/2014 | Ishikawa | B60R 21/215 280/728.3 |
| 2015/0346413 | A1* | 12/2015 | Kadoriku | G02B 6/0016 362/613 |

* cited by examiner

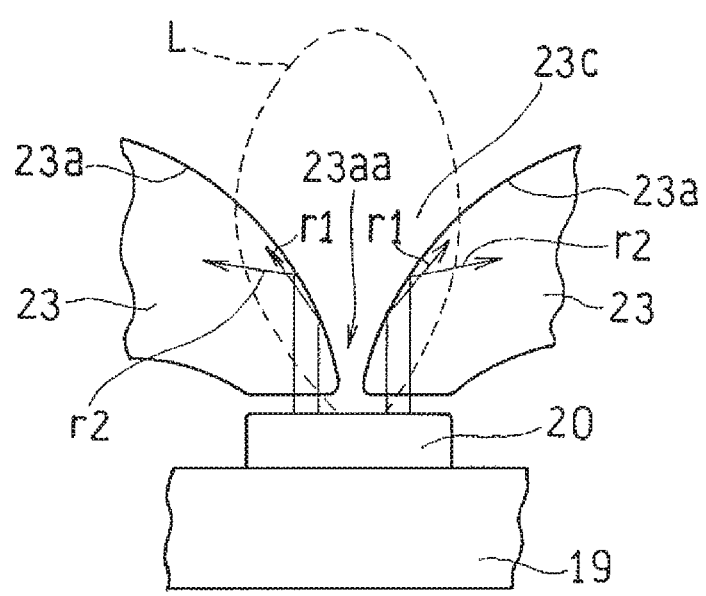

LIGHT-EMITTING ACCESSORY HAVING A LIGHT GUIDE BODY WITH AN INCLINED PORTION

CROSS-REFERENCE TO THE RELATED APPLICATION

This application claims priority to Japanese Patent Application No. 2015-117408 filed on Jun. 10, 2015, the entire disclosure of which is herein incorporated by reference as a part of this application.

FIELD OF THE INVENTION

The present invention relates to accessories such as key-holders or key-rings, straps of cell phones, and badges attached to e.g., clothes, bags, and hats. Specifically, the present invention relates to accessories with a built-in light source capable of emitting light by lighting or flashing the light source.

BACKGROUND ART

Conventionally, light sources such as LEDs have been equipped inside accessories so as to emit light from a part of or a whole of the accessory such as badge by radiating light from the light sources. Light emission from the accessories has been performed for various purposes including a purpose of providing an illumination function to the accessories, or a purpose of lighting or flashing the accessories attached to clothes or backs for preventing traffic accident and/or crimes in the night time, in addition to purposes of highlighting surface or interior designs or shapes of the accessories, or decorating the accessories.

JP Laid-open Patent Publication No. 2009-183327 discloses an accessory product having: a colored semi-transparent case body that has three-dimensional outer shapes of e.g., pentagram with a partitioned interior structure constituting a void space; a plurality of LED substrates provided in the void space; a power source; and a switch for ON/OFF operation of the power source, such that the accessory product is visible with the mixed color of the light caused by transmission of light with various light-emitting colors of LEDs through the colored case.

For example, as an effect achieved by the accessory product of the above-described constitution, it is possible to provide functions of warning lamps to the accessories, and to prevent a traffic accident by having the accessory emit a light in the night time.

Japanese Utility Model Registration No. 3161581 discloses a light emitting accessory having a light transmission body and a light emitter, wherein the light emitter including an LED is housed behind the light permeable body such that the light emitted from the light emitter transmits through the light permeable body having a concrete shape and exit from surfaces of the light permeable body while refracting at portions of the surface. This document further discloses the accessory wherein a recess portion is formed on a backside of the light permeable body such that the light emitted from the single LED provided at a center portion is scattered to the recess portion and thereby emitting the various refracted lights from the portions of the light permeable body.

According to the above-described constitution of the accessory, as a result of light emission of LED behind the light permeable body and light transmission through the light permeable body, characteristic refraction lights are visible on the respective surface portions of the light permeable body, thereby improving the appearance of the light emitting accessory. In addition, it is possible to reduce the size of the accessory by housing the light emitter including an LED inside the recess portion formed on the back side of the light permeable body.

According to the accessory product disclosed in JP Laid-open Patent Publication No. 2009-183327, since a plurality of LEDs are provided to illuminate entire portion of the accessory, there are some problems such as increased production cost, increased manufacturing process for assembling the LEDs, and increased size of the product for ensuring the space for installing the LEDs. In addition, since the luminance of the accessory is extremely high at a LED-installed portion relative to the other portions, it is impossible to achieve homogeneous or uniform light emission from the entirety of the accessory product of JP Laid-open Patent Publication No. 2009-183327, regardless of the arrangement of the plurality of LEDs.

According to the light emitting accessory disclosed in Japanese Utility Model Registration No. 3161581, since the accessory has only one light source and the luminance of the light emitted from the portions of the accessory decreases with increasing distance from the light source. Therefore, it is impossible to achieve a homogeneous or uniform light emission from the entirety of the accessory.

SUMMARY OF THE INVENTION

An object of the present invention is to provide a light emitting accessory that enables uniform light emission while suppressing luminance unevenness even when a small number of light sources, for example, a single light source, is employed.

A light-emitting accessory according to the present invention includes: a light source; a light guide body that guides a light radiated (emitted) from the light source; a case body that holds the light source and the light guide body and has an attachment to an outside thereof; a cover body formed by a light permeable material and being attached to the case body to cover the light source and the light guide body. The light guide body has a back surface facing the light source, a front surface opposite to the back surface and an inclined portion (beveled portion) formed on the front surface, in the vicinity of a center of the light guide body, the inclined portion being inclined with respect to a direction of thickness of the light guide body. The light source is disposed in a position in alignment with the inclined portion.

The light-emitting accessory according to the present invention includes the light guide body that guides the light radiated from the light source, where the light guide body has the back surface facing the light guide body and the front surface opposite to the back surface, the front surface has the inclined portion inclining with respect to the direction of thickness of the light guide body, and the light source confronts the inclined portion in the vicinity of the center of the light guide body. Therefore, even where a small number of light sources, e.g., a single light source, is employed, it is possible to provide the light-emitting accessory that emits the uniform and planar light by guiding the light reflected by the inclined portion from the vicinity of the center of the light guide body to the entire portion of the light guide body, and thereby suppressing unevenness of luminance.

Preferably, the inclined portion has a shape surrounding a recess, where the front surface of the light guide body is recessed towards the light source facing the back surface side of the light guide body. Since the inclined portion has a shape that surrounds the recess, the light from the light source is guided radially from the vicinity of the center of the light guide body to portions distant from the center. By this constitution, it is possible to further suppress the unevenness of luminance, and thereby providing the light-emitting accessory that shows uniform or homogeneous and planar light emission.

Preferably, the front surface in the inclined portion of the light guide body is a curved surface bulging towards the center of the recess. Since the inclined portion has the curved surface bulging towards the center of the recess, the light from the light source is further surely totally reflected by the inner side of the curved face, and is guided radially from the vicinity of the center of the light guide body to portions distant from the center. By this constitution, it is possible to suppress the unevenness of luminance further securely and thereby providing the light-emitting accessory that shows uniform or homogeneous and planar light emission.

Preferably, a through-hole that penetrates the light guide body in the direction of thickness is formed in a bottom of the recess. Since the bottom of the recess has a through-hole, the light from the light source partially exists to outside the light guide body through the through-hole, it is possible to suppress high luminance of the light guide body in the bottom and around the bottom.

Preferably, light scattering particles are dispersed inside or in the interior of the light guide body. Since the light scattering particles are dispersed in the light guide body, scattering of the light from the light source is enhanced by the light scattering particles inside the light guide body, thereby enabling emission of gentle and soft light. As a result, it is possible to provide the light-emitting accessory that shows uniform or homogeneous and planar light emission while suppressing the unevenness of luminance.

A light transmissive picture sheet may be arranged between the cover body and the light guide body. By the arrangement of the picture sheet, for example, printed with a logotype and/or a character of an animation or a movie, it is possible to make the light-emitting accessories character goods. The picture sheet may be exchanged easily, and countless variations of the light-emitting accessory may be provided. As alternatives to the above-described characters and logotypes, photographs of landscape or famous persons may be printed in the picture sheet.

An outer shape of the picture sheet may be smaller than that of the cover body and that of the light guide body. In addition to the light emission from the portion of the picture sheet, stronger light-emission is observed in a portion surrounding the picture sheet in a shape of belt, for example, in an annular shape by using the picture sheet having the outer shape smaller than that of the cover body and that of the light guide body. As a result it is possible to achieve advantageous effect of characteristic illumination.

Preferably, the cover body and the light guide body have disc shapes, and outer peripheral portions of the disc-shapes are curved toward a back surface facing the case body such that the outer peripheral portions bulge to the radially outward direction. Since the outer peripheral portions of the cover body and the light guide body are curved, it is possible to avoid a possibility of e.g., harming a hand by touching the outer peripheral portion, and thereby enabling comfortable touch. In addition, it is possible to achieve soft and fantastic illumination effect.

Preferably, the attachment is a pair of engaging claws that are spaced apart from each other with a predetermined distance and molded integrally with the case body. Since the engaging claws are molded integrally, spaced apart from each other, it is possible to prevent deviation of position and to position the accessory securely compared to the case of using a single engaging claw. Therefore, it is possible to avoid attaching of the accessory in a slanted state. Further, since the attachment is molded integrally with the case body, it is possible to avoid drop out of the attachment from the case body and to avoid a complicated production process of the attachment compared to the case where the attachment is installed as a separate parts.

The present invention should be construed to encompass any combinations of at least two constitutions described in claims and/or specification and/or drawings. Specifically, the present invention should be construed to encompass any combinations of two or more claims.

BRIEF EXPLANATION OF DRAWINGS

The present invention will be understood clearly based on the below-described explanation of preferred embodiments with reference to the accompanying drawings. However, it should be noted that the embodiments and drawings are merely illustrative and explanatory examples, and are not to be taken as limiting the scope of the invention. The scope of the invention is determined by the appended claims. In the accompanying drawings, same elements throughout different drawings are shown by the same reference numerals.

FIG. 8 shows a vertical cross sectional view enlarging a main part of the badge around a light source.

DETAILED DESCRIPTION OF THE INVENTION

In the following, an embodiment of the present invention will be explained with reference to the drawings.

Figure 1:
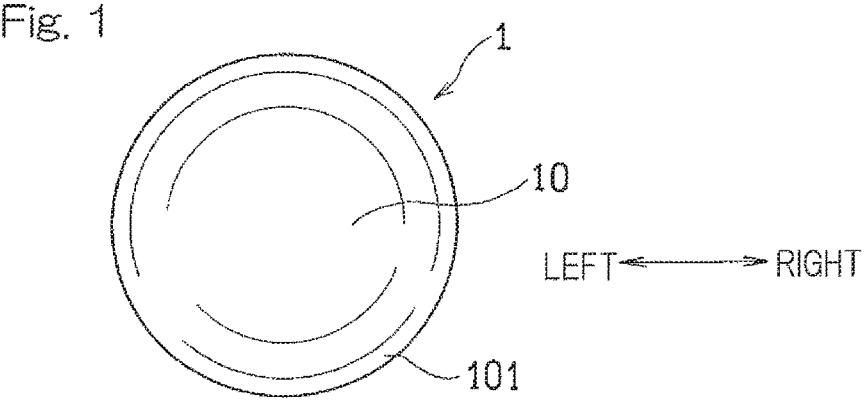
FIG. 1 shows a front view of a badge as an example of an light-emitting accessory according to an embodiment of the present invention, where the badge is observed from the side of a light emitting plane.
Figure 2:
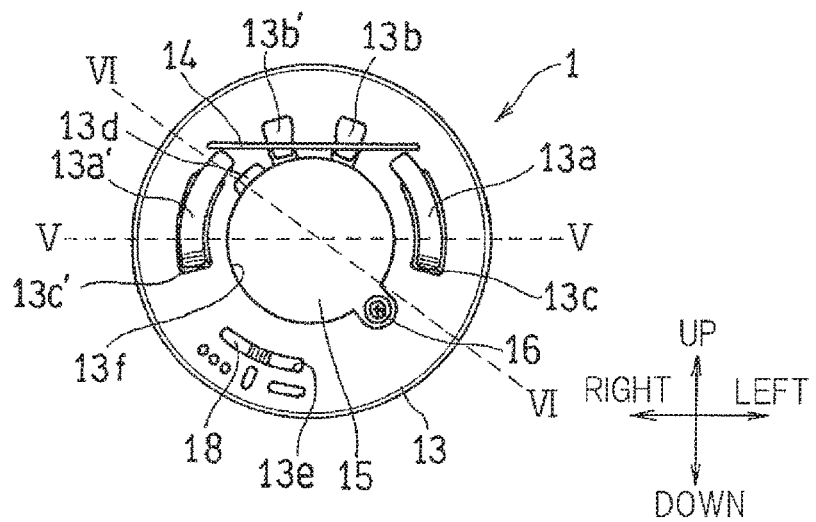
FIG. 2 shows a rear view of the badge observed from the side of a back surface opposite to the light emitting plane.
Figure 3:
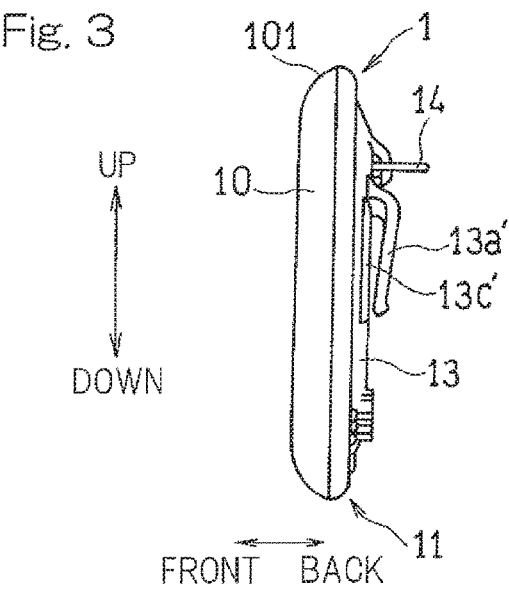
FIG. 3 shows a side view of the badge observed laterally.

A front view of a badge 1 as an example of an light-emitting accessory according to an embodiment of the present invention is shown in FIG. 1, where the badge is observed from the side of a front surface of a light emitting plane. A rear view of the badge 1 observed from the side of a back surface opposite to the light emitting plane is shown in FIG. 2. A side view of the badge 1 observed from a lateral side (right side of FIG. 1) is shown in FIG. 3.

The badge 1 shown in FIG. 1 is made to have a (circular) disc shape of approximately 50 mm in diameter. A cover body 10 that constitutes a light emitting-plane also has the disc shape of the same dimension. As shown in FIG. 3, an outer peripheral portion 101 of the cover body 10 is formed to curve toward a back surface facing a case body 11 such that the portions 101 bulge to the radially outward direction. Specifically, where the cover body 10 is placed horizontally, a diameter of the horizontal section of the outer peripheral portion 101 firstly increases, and then decreases toward the backside. The cover body 10 is made of transparent or semi-transparent (translucent) light-permeable material such that a light from a light source housed inside the case body 11 can be irradiated to the outside.

In the present embodiment, the cover body 10 is formed to have a thickness of 0.4 mm by pressure forming (pressure molding) of a semi-transparent polycarbonate resin. Since the outer peripheral portion 101 of the cover body 10 is formed to have the above-described curved shape, a characteristic light emission can be achieved in this curved portion by refraction of the light or the like, and a fantastic illumination effect can be obtained. The surface of the cover body 10 is gross-processed so as to have a luxury appearance. Further, the surface of the cover body 10 is curved such that the surface slightly protrudes from the backside to the front side. By this constitution, a strength of the cover body 10 is improved.

Figure 4:
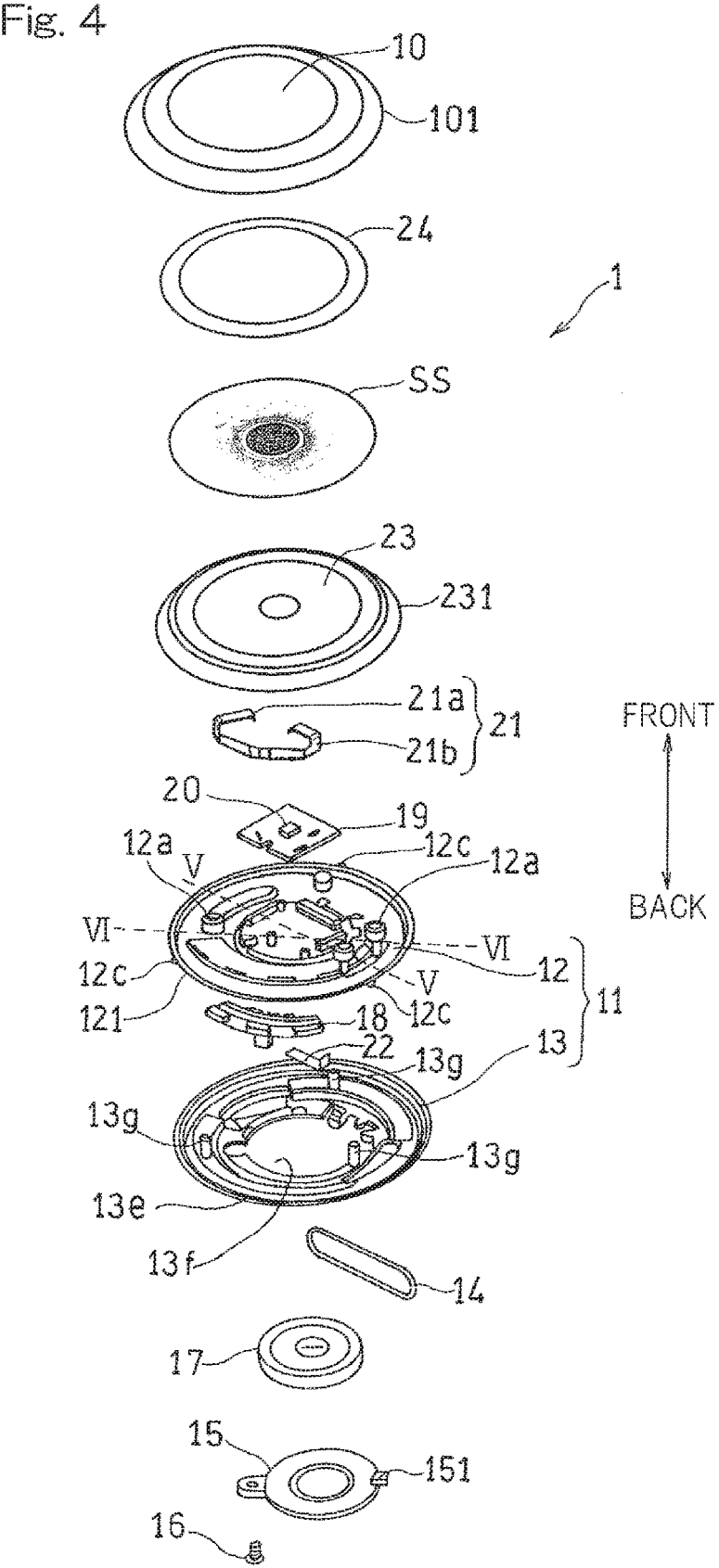
FIG. 4 shows a perspective view of the badges disassembled to respective parts.

The case body 11 of the badge 1 includes below described housing section 12 and cover section 13 (FIG. 4). As shown in FIG. 2, a pair of engaging claws 13a, 13a' as an attachment to clothes, bags, or the like is formed integrally in a backside of the case body 11, that is, in a backside of the cover section 13. The engaging claws 13a and 13a' are spaced apart from each other and arranged with a predetermined distance therebetween on the back surface of the cover section 13, and are formed integrally with the case body 11 such that the engaging claws 13a and 13a' elongate toward the lower direction shown in FIG. 3. This constitution is desirable since it is possible to fix the badge 1 by hooking the engaging claws 13a and 13a' on an edge of a pocket of a cloth or the like, and to fix the badge 1 while adjusting the vertical positioning of the badge 1. Since two engaging claws 13a and 13a' are formed to be spaced apart from each other as shown in FIG. 2, it is possible to suppress a rotation of the badge 1 about axial direction of the surface of the badge 1, to position the badge precisely, and to prevent deviation of the position of the badge 1. Therefore, the above-described constitution is advantageous.

Openings 13c and 13c' are formed in the back surface of the cover section 13 such that the openings 13c and 13c' face the engaging claws 13a and 13a' respectively. Due to this construction, the engaging claws 13a and 13a' do not have undercut shapes, and thereby enabling integral formation during processing of the engaging claws 13a and 13a' while avoiding the use of slide pieces or the like. For the formation of engaging claws 13a and 13a' using slide pieces, formation of the openings 13c and 13c' is avoided, but the production process is complicated. On the other hand, in the present embodiment, the engaging claws 13a and 13a' are formed while forming the openings 13c and 13c'. Since below described protrusions 12b and 12b' (FIG. 5) formed in the housing section 12 engage with the openings 13c and 13c', opening spaces of the openings 13c and 13c' are closed. It is possible to suppress ingress of particles, dust, water or the like into the interior of the badge 1.

As an alternative attachment, the badge 1 is provided with a safety pin 14 that is locked to a pair of engaging portions 13b and 13b' integrally formed in the back side of the cover section 13 as shown in FIG. 2. By this constitution, even where a cloth lacks pockets or the like to be hooked by the engaging claws 13a and 13a', it is possible to attach the badge 1 using the safety pin 14. While the safety pin 14 engaged by the engaging portion 13b and 13b' is used as the attachment in the present embodiment, it is possible to employ an alternative attachment instead of the safety pin 14 by engaging a strap of a looped string or the like with the engaging portions 13b and 13b'. By this constitution, an user may drape the string with the badge 1 around the neck, as an alternative to the way of wearing the badge 1, for example, by hooking the badge 1 on the pocket or the like using the engaging claws 13a and 13a' or by attaching the badge 1 using the safety pin 14, allowing the user to select the way of attaching the badge 1 from different ways in accordance with the preference of the user or with the use of the badge 1, thereby improving a utility of the badge 1. The attachment is not limited to the above-explained constitutions. For example, known attachments such as a magnet, a magic zipper or the like may be used as an alternative attachment.

An opening 13f is formed in the center of the cover section 13, and a lid member 15 is attached or fixed by a screw 16 such that the lid member 15 closes the opening 13f. The opening 13f is provided for a purpose of exchanging a battery 17 (FIG. 4), and is closed in openable manner by the lid member 15 of FIG. 2. An engaging section 13d is formed in a part of a periphery of the opening 13f such that a protrusion 151 (FIG. 4) formed in the lid member 15 that is engage with the cover section 13 is engaged in the interior of the engaging section 13d. The way of attaching the lid member 15 is not limited to the present constitution where the lid member 15 is fixed using a screw 16. For example, the lid member 15 may be fixed to the cover section 13 by engaging an engaging claw or the like formed in a side wall of the lid member 15 with an engaging hole provided to a wall surrounding the opening 13f of the cover section 13.

A slit 13e (FIG. 2) is formed in the cover section 13 such that a switching member 18 protrudes from the slit 13e, and the switching member 18 is arranged in slidably movable manner in the slit 13e. The badge 1 is lightened by sliding the switching member 18 to one end or to the other end in the slit 13e and thereby pressing an electrode 21 of FIG. 4 to make the electrode 21 contact with the battery 17. The light of the badge 1 is quenched or turned off by sliding back the switching member, and thereby disconnecting the contact between the electrode 21 and the battery 17. Thus, lighting and quenching of the badge 1 can be switched. More specifically, where the switching member 18 is slid to the one end of the slit 13e, the badge 1 is lightened by the contact of electrode 21a with the battery 17, and the badge 1 is flashed by sliding the switching member 18 to the other end of the slit 13e, thereby to make the electrode 21b contact with the battery 17. Thus, the badge 1 of the present embodiment can be switched between three stages, lightened stage, quenched stage, and flashed stage. The switching member 18 has a sufficient length such that the slit 13e is not opened even when the switching member 18 is slid to either one of the both ends.

Figure 5:
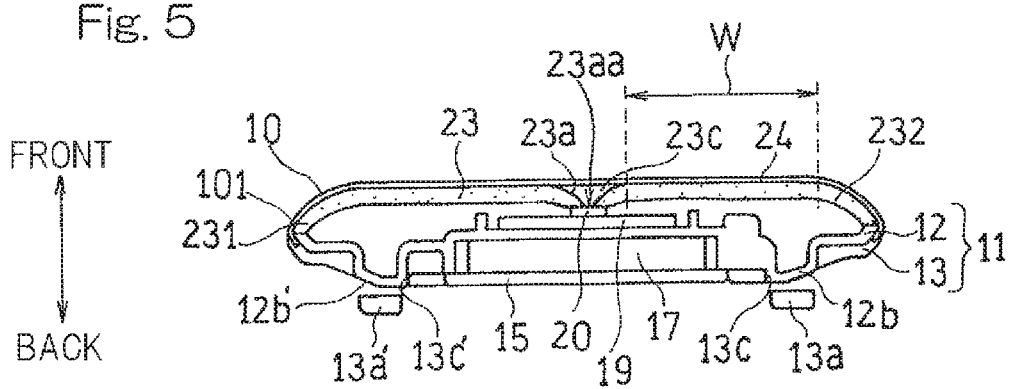
FIG. 5 shows a cross-sectional view of the badge taken along V-V line in FIG. 2.
Figure 6:
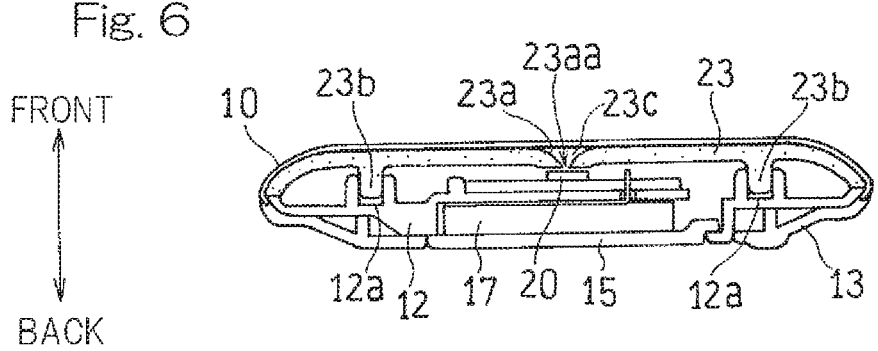
FIG. 6 shows a cross-sectional view of the badge taken along VI-VI line in FIG. 2.

FIG. 5 is a cross-sectional view of the badge taken along V-V line in FIG. 2. FIG. 6 is a cross-sectional view of the badge taken along VI-VI line in FIG. 2.

As shown in FIG. 5, the housing section 12 and the cover section 13 of the case body 11 are fixed to each other by engaging with each other, and thereby forming a space for housing (storing) substrate 19, switching member 18, battery 17 and the like. A protrusions 13g in FIG. 4 are integrally formed in three positions of the cover section 13 such that the protrusions 13g are positioned on vertexes of an equilateral triangle in planer view. By press fitting the protrusions 13g in three recesses (not shown) integrally formed in the housing section 12, the housing section 12 and the cover section 13 are fixed to each other.

A single LED (light-emitting diode) 20 is installed in the center of a substrate 19 so as to act as the light source by which the badge 1 emits light. While a bluish white LED is used as the LED 20 in the present embodiment, the LED 20 is not limited to this constitution. For example, blue color LED, red color LED, or full color LED that allows color change of emitted light may be applied as the light source (LED 20). The positive electrode 21 and a negative electrode 22 are assembled to the substrate 19, and the negative electrode 22 is in contact with the negative electrode of the battery 22. Contact and non-contact between the positive electrode 21 and the battery 17 are switched by sliding the switching member 18, and thereby allowing to switch between lighting (or flashing) and quenching of the LED 20.

Figure 7:
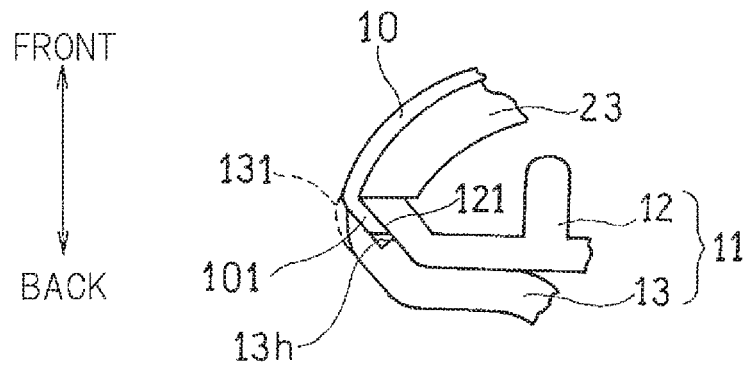
FIG. 7 shows a vertical cross sectional view enlarging an outer peripheral portion of the badge.

As shown in FIG. 5, one side of the housing section 12 to which the LED 20 is installed is covered by the cover body 10. The cover body 10 is attached and fixed to the case body 11 by press fitting an end rim of the outer peripheral portion 101 of the cover body 10 into a groove formed between a side wall of the housing section 12 and a step portion 13h formed in the cover section 13 as shown in FIG. 7. As shown in FIG. 5, the light guide body 23, which has the disc shape and the curved portion mentioned above, is disposed between the cover body 10 and the case body 11 such that the light guide body 23 is covered by the cover body 10. The light guide body 23 guides the light emitted from the LED 20 thereby to emit planer light such that the entire surface of the badge 1 emits light. By the use of the light guide body 23, it is possible to make the entire surface of the badge 1 emit light even when a single LED 20 is used as the light source. Therefore, it is possible to achieve both of cost saving and space saving effects.

Since a mold body formed by molding a semi-transparent (or transparent) resin material is used as the cover body 10, the light guided and irradiated as the planer light by the light guide body 23 transmits the cover body 10 and is emitted to outside of the badge 1. Therefore, it is possible to add a value to the badge by providing illumination effect and/or lighting function.

In the present embodiment, a picture sheer 24, for example, printed with a character or the like is arranged between the cover body 10 and the light guide body 23. The picture sheet 24 is made of transparent or semi-transparent (translucent) material, for example, resin film such as a PET film or a PP film. The character, logotype or the like printed on the picture sheet 24 is highlighted or decorated by the transmission of the light through the picture sheet 24. Therefore, compared to the conventional can badges or the like, it is possible to provide luxury appearance to the badge 1, and to improve visibility of the badge in dark field of view, for example, in night time, by the use of the picture sheet 24. Since the picture sheet 24 can be exchanged, it is possible to apply picture sheets of various designs advantageously.

An outer shape of the picture sheet 24 is smaller than that of the cover body 10 and that of the light guide body 23. That is, the picture sheet 24 has smaller area than the areas of light-emitting surfaces of the cover body 10 and the area of the light guide 23. Specifically, the picture sheet 24 has substantially circular shape, where the diameter of the picture sheet 24 is smaller than that of the cover body 10 and the light guide body 23. By this constitution, the outer peripheral portion of the light guide body 23 not overlapped or overlaid with the picture sheet 24 has relatively high luminance. As a result, an annular area surrounding the picture sheet 24 shows intense light emittance providing the characteristic illumination effect. The badge 1 may has non-circular shape, for example, multi-angular shape such as tetragonal or pentagonal shape in the front view. For example, where the badge has the pentagonal shape, the surrounding area of the picture sheet 24 emits a light in the form of pentagonal band.

A transparent acrylic resin (PMMA: polymethyl methacrylate) dispersing light scattering particles 232 in its interior is used to form the light guide body 23. The light guide body 23 has a disc shape of 0.5 mm in thickness, and is formed by injection molding to have an outer shape and a dimension that allow engagement of the light guide body 23 with the cover body 10. An outer peripheral portion 231 of the light guide body 23 is curved from the front side to the back side mentioned above such that the light guide body 23 protrudes in a radially outward direction. A vertical section of the light guide body 23 shows a planer light emitting front surface and a curved portion having a curved arc shape arranged on both side of the light emitting surface. Specifically, where the light guide body 23 is placed horizontally, a diameter of a horizontal section of the outer peripheral portion 231 firstly increases, and then decreases toward the backside. Since the outer peripheral portions of the respective disc shaped cover body 10 and light guide body 23 are curved, it is possible to avoid a possibility of e.g., harming a hand by touching the outer peripheral portion, and thereby enabling comfortable touch. In addition, it is possible to achieve a soft and fantastic illumination effect.

Light scattering particles 232 are fine particles of submicron meters to several tens micron meters in particle diameter and have refractive indices different from the matrix resin (PMMA resin) of the light guide body 23. The light scattering particles 232 are dispersed substantially uniformly in the matrix resin. The light is irradiated from the light source 2, incident in the light guide body 23, and is guided and diffused in the light guide body 23. The dispersed light scattered by the scattering particles 232 enhances diffusion thereof, and the light reflected and/or scattered by the light scattering particles 232 such that the incident angle to the surface of the light guide body 23 exceeds a total reflection angle (critical angle) is emitted to the outside of the light guide body 23. Thus, the badge 1 can emit light further uniformly, and can emit a gentle and soft light.

The disc-shaped light guide body 23 has a front surface (first surface) and a back surface (second surface) opposite to the first surface facing to the LED 20. An inclined portion 23a inclined in the direction of thickness of the light guide body 23 is formed in approximately radial center portion (e.g., center of the disc shape and the portion surrounding the center) of the front surface of the light guide body 23 of FIG. 5. The LED 20 is disposed such that the LED 20 faces to the inclined portion 23a and emits light in the direction of the inclined portion 23a. In the present embodiment, the inclined portion 23a has a configuration of slope surrounding a recess 23c, where the front surface of the light guide body 23 is recessed towards the LED 20 placed on the backside thereof. The recess 23c is surrounded by the surface of the light guide body 23 that shows a circular contour in a section perpendicular to the thickness direction of the light guide body 23, where the diameter of the circle gradually increases in the direction from the back side to the front side. Specifically, the surface of the inclined portion 23a is a curved surface bulging towards the center of the recess 23c. By this curved shape, the light from the light source 20 is totally reflected by the inner side of the curved surface more securely, and is guided in the light guide body 23 radially from the vicinity of the center of the light guide body 23 to portions distant from the center. By this construction, it is possible to suppress the unevenness of luminance further securely and thereby providing light-emitting accessory that shows planer light emission homogeneously or uniformly.

In the present embodiment, a through-hole 23aa that penetrates the light guide body 23 in the thickness direction is formed in the bottom of the recess 23c. Therefore, the disposed position of the LED 20 is close to the through-hole 23aa of the light guide body 23. Specifically, the through-hole 23aa is designed in a position directly facing the LED 20 as a light source. In this constitution, there is a smaller possibility of constraining the disposed position of the LED 20 compared to a constitution where the LED 20 as the light source is disposed to face the side surface of the light guide body 23. Therefore, it is possible to design the badge 1 more freely. Preferably, a distance between the light emitting surface of the LED 20 and the back surface of the light guide body 23 is 1.0 mm or less, more preferably 0.5 mm or less.

The recess 23c is surrounded by the inclined portion 23a that constitutes a substantially cone shaped side wall mentioned above, where the diameter of the sectioned circle of the cone gradually increases from the back side to the front side of the light guide body 23 while increasing change rate of the diameter gradually. The inclined portion 23a shows a change of inclination such that a steep inclination is gradually changed to moderate inclination from the back side to the front side of the light guide body 23. As shown in FIG. 8, by this inclination change, the light r1 radiated from the vicinity of the center of the LED 20 is reflected by the inner side of the inclined portion (inclined surface) of the light guide body 23 near the through-hole 23aa. Since the inner side of the inclined portion 23a has a steep inclination to the direction of the incident light, the direction of the emitted light r1 is not changed largely in the radial direction of the light guide body 23 at the first time reflection. That is, a traveling direction of the emitted light r1 is not changed largely in the upward direction in FIG. 8. On the other hand, since the inclination, to the direction of radiated light from the LED 20, of the inner side of the inclined portion 23a is changed to a gentle inclination with increasing distance from the center of the LED 20, the light r2 radiated from a portion except the vicinity of the center of the LED 20 shows large change of travelling direction by the first time reflection in radial direction of the light guide body 23, and shows large change of travelling direction in the upward direction in FIG. 8. Thus, the emitted light is guided in the light guide body 23 while repeating reflection and scattering therein.

As shown in FIG. 5, a planar portion W of the part of the light guide body 23 is located from the radially outer side of the inclined portion 23a to the radially inner side of the outer peripheral portion 231. The planer portion W is formed to have a thickness that gradually decreases in the radial direction from the center to the outer peripheral portion 231. By this constitution, the light reflection exceeding the critical angle increases with increasing distance from the LED 20, and the light tends to be emitted to the outside. Thus, a proportion of emitted light increases in the portion distant from the LED 20 with decreasing intensity of light, thereby allowing homogeneous or uniform light emission from the badge 1. By the above-described constitution, the light emitted from the single LED 20 is utilized efficiently, and is dispersed in the light guide body 23 to enable planer light emission in the surface of the light guide body 23. That is, it is possible to achieve a prominent effect compared to the conventional light-emitting accessories by realizing homogeneous or uniform planer light emission from the entirety of the badge 1 while using a single LED 20.

A directional characteristics L of the LED 20 is also shown in FIG. 8. Luminosity L steeply decreases with increasing an angle of travelling direction of the irradiated light from the normal axis of the radiation plane of the LED 20. For example, luminosity is reduced to zero, where the above-described angle from the normal axis is 30 to 40 degree or more. Preferably, so as to enhance the utilization efficiency of the emitted light, the through-hole 23aa has a diameter of not smaller than a diameter of an effective emission area of the LED 20 in the position of the through-hole 23aa, where the effective emission area is determined depending on the directional characteristics L. The opening of the through hole in the back surface of the light guide body 23 may have a diameter of 0.1 to 1.0 mm, preferably 0.2 to 0.5 mm. The opening of the through hole in the front surface of the light guide body 23 may have a diameter of 1.0 to 15.0 mm, preferably 4.0 to 10.0 mm. Although a single LED 20 and a single through-hole 23aa are provided for the badge 1 of the present embodiment, the numbers of LED and through hole are not limited to single one. For example, a plurality of LED may be provided. In that case, a plurality of through-holes 23aa may be provided. Other than the substantial cone-shape of the above-described embodiment, the recess 23c may have a tapered shape of square pyramid, hexagonal pyramid, elliptic cone or the like, semi-spherical shape, or a shape formed by slightly deforming any of the above-described shapes.

Since the through-hole 23aa is formed in the position substantially directly above the LED 20, in the portion around the through-hole 23aa, the light emitted from the light source is reflected and/or scattered by the inclined portion 23a and the light scattering particles 232, and diffuses radially in the light guide body. Since the through hole 23aa penetrates the light guide body 23 in the direction of thickness (vertically), a part of the emitted light emitted from the vicinity of the center of the light source passes through the through-hole 23aa, and is not guided in the light guide body 23. By this constitution, it is possible to prevent the light guide body 23 from showing higher luminosity in the portion near the center than the luminosity in the other portions. Thus, it is possible to suppress unevenness of luminance in the vicinity of the center of the light guide body 23, and thereby emitting light further homogeneously or uniformly from the entire light emitting plane of the light guide body 23. However, there is a possibility where the light that has passed through the through-hole 23aa is irradiated to the cover body 10 and/or the picture sheet 24 to show spot lighting of the center of the badge 1, and thereby deteriorating design and/or illumination effect of the badge 1. Therefore, a light shield sheet SS in a form of partially shield sheet may be inserted between the picture sheet 24 and the light guide body 23 of FIG. 4, where the light shield sheet SS may be formed by coating a light shielding material on a portion corresponding to the spot lighting position near the position directly facing the through-hole 23aa. For example, the light shield sheet SS may have a circular dark gray coating on the area including the spot lighting position such that the dark gray color is paled with increasing distance from the center. By the use of the light shield sheer SS, it is possible to suppress spot-lighting and to prevent deterioration of design and illumination effect. As an alternative way of light shielding, the above-described circular dark gray coating may be provided to the back face of the picture sheet 24. Other colored coating may be provided as an alternative to the circular dark gray coating.

Polycarbonate resin, polypropylene resin, polyethylene resin, silicone resin or the like may be used as an alternative to the acrylic resin as a material of the light guide body 23. Semi-transparent resin (translucent resin) may be used instead of the transparent resin.

As shown in FIG. 6, two protrusions 23b are formed in the back face of the light guide body 23 protruding on the line B-B shown in FIG. 2 and FIG. 4. By press fitting the protrusions 23b in the recessed portions 12a formed in the housing section 12, the light guide body 23 is positioned and fixed on the housing section 12.

As shown in FIG. 7, the cover body 10 is attached and fixed to the case body 11 by press fitting an end rim of the outer peripheral portion 101 of the cover body 10 into the groove formed between the outer side wall of the housing section 12 and the step portion 13h formed in the cover section 13. The end rim of the outer peripheral portion 101 of the cover body 10 has an inner diameter that slightly decreases from the front side to the back side of the badge 1 such that the cover body 10 slightly bite into the housing section 12 so as not to drop from the groove. The end rim facing the front side of the cover body 13 has a shape where a portion shown by the dashed line 131 is chamfered. The dashed line 131 shows a hypothetical surface that have provided smooth connection from the cover section 13 to the cover body 10. By this chamfered shape, it is possible to avoid a disadvantage in that the end rim of the cover section 13 protrudes from the cover body 10 as knife edge during the production process of the badge 1 and sticks in a hand.

As shown in FIG. 4, engaging protrusions 12c are formed, for example, in three positions with a constant spacing therebetween on the outer peripheral wall 121 of the housing section 12 of FIG. 7. For example, the engaging protrusions 12c may have a dimension of 0.05 mm in thickness, 0.5 mm in width, and 2 mm in vertical length. Here, since only the portions to which the engaging protrusions 12c are provided have an interference design, it is possible to suppress the mechanical interference to a degree such that the press fitting of cover body 10 to the groove is not disturbed, while avoiding a rotation motion of the cover body 10 about its axis.

As explained above, according to the badge 1 of the present embodiment, the badge 1 includes a light guide body 23 that guide the light emitted from the light source 20, where the light guide body 23 has a back surface facing the light source 20, and a front surface opposite to the back surface, the front surface has an inclined portion 23a inclining with respect to the direction of thickness of the light guide body 23, and the light source 20 faces or confronts to the inclined portion 23a near the center of the light guide body 23. Therefore, it is possible to reflect the light from the light source 20 at the inclined portion 24a and guide the light from the vicinity of the center of the light guide body 23 to the entire portion of the light guide body 23, and thereby providing the badge 1 that emits homogeneously or uniformly the planer light with suppressed unevenness of luminance. By providing the illumination effect by making the badge 1 emit light as described-above, it is possible to achieve additional value that cannot be found in the conventional can badges, and thereby remarkably improving merchantability of the badge 1. In addition, since illumination effect in darkness can be obtained, it is possible to use the badge 1 as an emergency illumination device. Where the accessory is used as a key holder, it is possible to improve visibility of key hole in the darkness. In addition, it is possible to achieve traffic safety effect, for example, by attaching and lightening the badge to clothes or shoes of children, and thereby attracting the attention of drivers.

Although the present invention has been fully described in connection with the preferred embodiments thereof with reference to the accompanying drawings which are used only for the purpose of illustration, those skilled in the art will readily conceive numerous additions, omissions, changes and modifications within the framework of obviousness upon the reading of the specification herein presented of the present invention. Accordingly, such additions, omissions, changes and modifications are, unless they depart from the scope of the present invention as delivered from the claims annexed hereto and their equivalents, to be construed as included within the scope. For example, the light emitting accessories may be used as straps of cell phones, name cards, tags, ornaments of bags or cars, as well as badges or key holders. The engaging claws 13a, 13a' and the engaging portions 13b and 13b' may be used as attachments to a bag or the like. Further, GPS function and/or a function of crime prevention buzzer may be installed inside the light emitting accessory. In this case, buzzer and light illumination (flashing or color changing) may preferably be combined to enhance the synergetic crime prevention effect. In addition, it is possible to provide auto-switching off function to switch off the light after a predetermined time for power saving of the battery. Solar cell may be used as a power source.

What is claimed is:

1. A light-emitting accessory comprising:
   a light source;
   a light guide body that guides a light radiated from the light source;
   a case body that holds the light source and the light guide body and has an attachment to an outside thereof; and
   a cover body formed by a light permeable material and being attached to the case body to cover the light source and the light guide body,
   wherein the light guide body has a back surface facing the light source, a front surface opposite to the back surface and an inclined portion formed on the front surface, in the vicinity of a center of the light guide body, the inclined portion being inclined with respect to a direction of thickness of the light guide body,
   wherein the light source is disposed in a position in alignment with the inclined portion and the light guide body is configured such that light from the light source exits from the front surface, and
   wherein a light transmissive picture sheet is arranged between the cover body and the light guide body.

2. The light emitting accessory according to claim 1, wherein an outer shape of the picture sheet is smaller than that of the cover body and that of the light guide body.

3. A light-emitting accessory comprising:
   a light source;
   a light guide body that guides a light radiated from the light source;
   a case body that holds the light source and the light guide body and has an attachment to an outside thereof; and
   a cover body formed by a light permeable material and being attached to the case body to cover the light source and the light guide body,
   wherein the light guide body has a back surface facing the light source, a front surface opposite to the back surface and an inclined portion formed on the front surface, in the vicinity of a center of the light guide body, the inclined portion being inclined with respect to a direction of thickness of the light guide body,
   wherein the light source is disposed in a position in alignment with the inclined portion and the light guide body is configured such that light from the light source exits from the front surface, and wherein the attachment is a pair of engaging claws that are spaced apart from each other with a predetermined distance and molded integrally with the case body.

4. A light-emitting accessory comprising:

a light source;

a light guide body that guides a light radiated from the light source;

a case body that holds the light source and the light guide body and has an attachment to an outside thereof; and a cover body formed by a light permeable material and being attached to the case body to cover the light source and the light guide body, wherein the light guide body has a back surface facing the light source, a front surface opposite to the back surface and an inclined portion formed on the front surface, in the vicinity of a center of the light guide body, the inclined portion being inclined with respect to a direction of thickness of the light guide body, wherein the light source is disposed in a position in alignment with the inclined portion, wherein the inclined portion has a shape surrounding a recess, where the front surface of the light guide body is recessed towards the light source facing the back surface side of the light guide body, and wherein a through-hole that penetrates the light guide body in the direction of thickness is formed in a bottom of the recess.

5. The light emitting accessory according to claim 4, wherein the front surface in the inclined portion of the light guide body is a curved surface bulging towards a center of the recess.

6. The light emitting accessory according to claim 4, wherein light scattering particles are dispersed inside the light guide body.

7. The light emitting accessory according to claim 4, wherein the cover body and the light guide body have disc shapes, and outer peripheral portions of the disc-shapes are curved towards a back surface facing the case body such that the outer peripheral portions bulge to the radially outward direction.

\* \* \* \* \*